US012600116B2

(12) United States Patent
Pudleiner et al.

(10) Patent No.: US 12,600,116 B2
(45) Date of Patent: Apr. 14, 2026

(54) SPECIAL POLYMER LAYERS FOR FASTER LAMINABILITY OF MULTILAYER STRUCTURES

(71) Applicant: Covestro Deutschland AG, Leverkusen (DE)

(72) Inventors: Heinz Pudleiner, Krefeld (DE); Georgios Tziovaras, Neuss (DE); Wieland Hovestadt, Leichlingen (DE); Stefan Janke, Brüggen (DE); Kira Planken, Goch (DE)

(73) Assignee: Covestro Deutschland AG, Leverkusen (DE)

( * ) Notice: Subject to any disclaimer, the term of this patent is extended or adjusted under 35 U.S.C. 154(b) by 141 days.

(21) Appl. No.: 18/576,811

(22) PCT Filed: Jul. 11, 2022

(86) PCT No.: PCT/EP2022/069277
§ 371 (c)(1),
(2) Date: Jan. 5, 2024

(87) PCT Pub. No.: WO2023/285356
PCT Pub. Date: Jan. 19, 2023

(65) Prior Publication Data
US 2024/0308191 A1 Sep. 19, 2024

(30) Foreign Application Priority Data
Jul. 14, 2021 (EP) ..................................... 21185504

(51) Int. Cl.
B32B 27/08 (2006.01)
B32B 7/027 (2019.01)
(Continued)

(52) U.S. Cl.
CPC .............. B32B 27/08 (2013.01); B32B 7/027 (2019.01); B32B 27/365 (2013.01);
(Continued)

(58) Field of Classification Search
CPC ........... B32B 2250/02; B32B 2250/03; B32B 2250/244; B32B 2270/00; B32B 2307/30;
(Continued)

(56) References Cited

U.S. PATENT DOCUMENTS 5,281,474 A 1/1994 Matsuzaki et al.
7,771,646 B2 8/2010 Clauss et al.
(Continued)

FOREIGN PATENT DOCUMENTS

DE 1966931 A1 5/1975
DE 3832396 A1 2/1990
(Continued)

OTHER PUBLICATIONS

Schnell, H., Chemistry and Physics of Polycarbonates, Interscience Publishers, New York 1964, p. 28 ff; p. 102 ff.
(Continued)

*Primary Examiner* — Lawrence D Ferguson
(74) *Attorney, Agent, or Firm* — Donald R. Palladino

(57) ABSTRACT

The invention relates to a multilayer structure (MS) comprising (SI) at least one first polymer layer (SI) comprising ≥95% by weight, preferably ≥98% by weight, particularly preferably ≥99% by weight, based on the total weight of the polymer layer (SI), of a polymer (PI) selected from the group consisting of a polycarbonate, a co-polycarbonate or mixtures thereof having a Vicat softening temperature≥149° C., preferably ≥160° C., further preferably ≥170° C.; more preferably ≥180° C., determined according to ISO 360:2004 (50N; 50°/h); (S2) at least one further polymer layer (S2) having a Vicat softening temperature<149° C., preferably
(Continued)

100

Figures 1, 2:

≥140° C., more preferably ≤130° C., determined according to ISO 306:2004 (50N; 50°/h), preferably in a range from 120° C. to 148° C.; (S3) optionally at least one third polymer layer (S3) having a Vicat softening temperature≥149° C., preferably ≥160° C., further preferably ≥170° C.; more preferably ≥180° C., determined according to ISO 306:2004 (50N; 50° h). The invention further relates to a process for producing a multilayer structure (MS) and to a security document comprising such a multilayer structure according to the invention.

18 Claims, 1 Drawing Sheet

(51) Int. Cl.

| | |
|---|---|
| *B32B 27/36* | (2006.01) |
| *B32B 37/18* | (2006.01) |
| *C09J 7/35* | (2018.01) |
| *C09J 169/00* | (2006.01) |

(52) U.S. Cl.
CPC .............. *B32B 37/182* (2013.01); *C09J 7/35* (2018.01); *C09J 169/005* (2013.01); *B32B 2250/03* (2013.01); *B32B 2250/244* (2013.01); *B32B 2270/00* (2013.01); *B32B 2307/306* (2013.01); *B32B 2307/308* (2013.01); *B32B 2307/414* (2013.01); *B32B 2307/7376* (2023.05); *B32B 2367/00* (2013.01); *B32B 2369/00* (2013.01); *B32B 2554/00* (2013.01); *C09J 2469/00* (2013.01)

(58) Field of Classification Search
CPC ........ B32B 2307/306; B32B 2307/308; B32B 2307/414; B32B 2307/7376; B32B 2367/00; B32B 2369/00; B32B 2554/00; B32B 27/08; B32B 27/365; B32B 37/182; B32B 7/027; C09J 169/005; C09J 2469/00; C09J 7/35

See application file for complete search history.

(56) References Cited

U.S. PATENT DOCUMENTS

| | | |
|---|---|---|
| 10,723,109 B2 | 7/2020 | Pudleiner et al. |
| 2011/0143126 A1 | 6/2011 | Meyer et al. |
| 2021/0001614 A1 | 1/2021 | Tziovaras et al. |
| 2021/0403661 A1 | 12/2021 | Tziovaras et al. |

FOREIGN PATENT DOCUMENTS

| | | |
|---|---|---|
| EP | 0359953 A1 | 3/1990 |
| GB | 1229482 A | 4/1971 |
| NL | 7802830 A | 9/1979 |
| WO | 2004050766 A1 | 6/2004 |
| WO | 2004050767 A1 | 6/2004 |

OTHER PUBLICATIONS

Legrand, D.G. et al., Handbook of Polycarbonate Science and Technology, Marcel Dekker New York 2000, p. 72 ff.

Freitag, D. et al., Bayer AG, "Polycarbonates" in Encyclopedia of Polymer Science and Engineering, vol. 11, Second Edition, 1988, pp. 648-718.

Grigo, U. et al., "Polycarbonate" [Polycarbonates] in Becker/Braun, Kunststoff-Handbuch [Plastics Handbook], vol. 3/1, Polycarbonate, Polyacetale, Polyester, Celluloseester [Polycarbonates, Polyacetals, Polyesters, Cellulose Esters], Carl Hanser Verlag Munich, Vienna 1992, pp. 117-299.

Brunelle, Daniel J., "Encyclopedia of Polymer Science and Technology", 2006, John Wiley & Sons, Inc., "Polycarbonates" on pp. 1 to 33.

International Search Report, PCT/EP2022/069277, date of mailing: Sep. 13, 2022, Authorized officer: Felix Weiss.

10

20

30

100

SPECIAL POLYMER LAYERS FOR FASTER LAMINABILITY OF MULTILAYER STRUCTURES

CROSS REFERENCE TO RELATED APPLICATIONS

This application is a national stage application under 35 U.S.C. § 371 of PCT/EP2022/069277, filed Jul. 11, 2022, which claims benefit of EP Application Serial No. 21185504.4, filed Jul. 14, 2021, both of which are incorporated herein by reference in their entireties.

FIELD OF THE INVENTION

The invention relates to a multilayer construction comprising at least two layers (S1) and (S2) and optionally further layers (S3), wherein at least one outer layer (S1) or (S3) contains a polymer (P1) or (P3) which has a Vicat softening temperature of ≥149° C. The invention further relates to a method for producing the multilayer construction (MA), to the use of the multilayer construction (MA) for producing laminates or security documents, and to the security document containing the multilayer construction (MA).

BACKGROUND OF THE INVENTION

The lamination of polymer films is of interest in many areas of application. When laminating different polymer films, problems of air inclusions, bubble formation or other deformations of the laminates occur time and again for a very wide variety of reasons. For instance, the incompatibility of the polymer materials plays a major role, as do the properties of the polymers used. Furthermore, when producing laminates there is a great need on the one hand to produce a long-lived product and on the other hand to be flexible in the choice of materials, and in addition also to be able to perform the lamination as rapidly as possible. Accordingly, there is a great and enduring need in the industry to achieve the complex manufacture of the laminates as rapidly and as efficiently as possible.

FIG. 1 schematically illustrates a multilayer construction (MA) 100 according to the invention; and FIG. 2 schematically illustrates the method.

DETAILED DESCRIPTION OF THE INVENTION

An object of the present invention was therefore that of minimizing at least one of the problems mentioned. Furthermore, an object of the invention was that of finding and using a combination of materials which, on the one hand, enable complex laminates to be incorporated into the layer construction, which is also particularly relevant for security documents, and, on the other hand, enable a cost-efficient and rapid production.

Surprisingly, it was found that the combination of features from claim 1 achieves these objects.

The invention firstly provides a multilayer construction (MA), comprising (S1) at least one first polymer layer (S1), which includes ≥95% by weight, preferably ≥98% by weight, particularly preferably ≥99% by weight, based on the total weight of the polymer layer (S1), of a polymer (PI) which is selected from the group consisting of a polycarbonate, a copolycarbonate or mixtures of these and has a Vicat softening temperature of ≥149° C., preferably ≥160° C., further preferably ≥170° C.; more preferably ≥180° C. determined according to ISO 306: 2004 (50 N: 50°/h);

(S2) at least one further polymer layer (S2) which has a Vicat softening temperature of <149° C., preferably ≤140° C., more preferably ≤130° C., determined according to ISO 306:2004 (50 N: 50°/h), preferably within a range from 120 to 148° C.;

(S3) optionally at least one third polymer layer (S3) which has a Vicat softening temperature of ≥149° C., preferably ≥160° C., further preferably ≥170° C.; more preferably ≥180° C. determined according to ISO 306: 2004 (50 N: 50°/h).

Preferably, the multilayer construction (MA) is a constituent of a security document or is the security document itself, in particular is the data page of a passport or is a personal identity card or other ID cards.

Depending on which substrate is to be processed with the multilayer construction (MA) to form a laminate, the multilayer construction (MA) either comprises only the two layers (S1) and (S2), the polymer layer (S1) forming an outer side of the resulting laminate, or additionally comprises the third polymer layer (S3). The use of the third polymer layer (S3) can help protect heat-sensitive layers in the laminate that are located between the substrate and the multilayer construction (MA) or the substrate itself from excessively high temperatures during the lamination process.

The polymer (PI) is preferably selected from the group consisting of aliphatic or aromatic polycarbonates or copolycarbonates.

Suitable poly- or copolycarbonates are preferably aromatic polycarbonates or copolycarbonates.

The polycarbonates or copolycarbonates may be linear or branched in known fashion.

These polycarbonates or copolycarbonates may be prepared in known fashion from diphenols, carbonic acid derivatives, optionally chain terminators and optionally branching agents. Details of the preparation of polycarbonates and copolycarbonates have been set out in many patent specifications over the past 40 years or so. Reference may be made here merely by way of example to Schnell. "Chemistry and Physics of Polycarbonates", Polymer Reviews. Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to Dres, U. Grigo, K. Kirchner and P. R. Müller, "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299. In the "Encyclopedia of Polymer Science and Technology", John Wiley & Sons, Inc., by Daniel J. Brunelle, the article "Polycarbonates" on pages 1 to 33 describes not only the preparation of suitable polycarbonates or copolycarbonates but particularly in table 3 on pages 10 to 13 describes aromatic polycarbonates based on bisphenols.

Suitable diphenols may, for example, be dihydroxyaryl compounds of general formula (I), $$HO-Z-OH \qquad (I)$$

in which Z is an aromatic radical having 6 to 34 carbon atoms which may contain one or more optionally substituted aromatic rings and aliphatic or cycloaliphatic radicals or alkylaryls or heteroatoms as bridging elements.

Examples of suitable dihydroxyaryl compounds include: dihydroxy benzenes, dihydroxydiphenyls, bis(hydroxy phenyl)alkanes, bis(hydroxyphenyl)cycloalkanes, bis(hydroxy phenyl)aryls, bis(hydroxyphenyl) ketones, bis(hydroxyphenyl) sulfones, bis(hydroxyphenyl) sulfoxides, and also the ring-alkylated and ring-halogenated compounds thereof.

These and further suitable other dihydroxyaryl compounds are described, for example, in DE-A 3 832 396, FR-A 1 561 518, in H. Schnell. Chemistry and Physics of Polycarbonates, Interscience Publishers, New York 1964, p. 28 ff; p. 102 ff, and in D. G. Legrand. J. T. Bendler, Handbook of Polycarbonate Science and Technology. Marcel Dekker New York 2000, p. 72 ff.

Preferred dihydroxyaryl compounds are, for example, resorcinol, 4,4'-dihydroxydiphenyl, bis(4-hydroxyphenyl) methane, bis(3,5-dimethyl-4-hydroxyphenyl)methane, bis (4-hydroxyphenyl)-diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl) ethane, 2,2-bis(3,5-dimethyl-4-hydroxyphenyl)propane, 2,2-bis(4-hydroxyphenyl)-1-phenylpropane, 2,2-bis(4-hydroxyphenyl)-hexafluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl) cyclohexane, 1,1-bis(3,5-dimethyl-4-hydroxyphenyl) cyclohexane, 1,1-bis(4-hydroxy phenyl)-4-methylcyclohexane, 1,3-bis [2-(4-hydroxyphenyl)-2-propyl] benzene, 1,1'-bis(4-hydroxyphenyl)-3-diisopropylbenzene, 1,1'-bis(4-hydroxyphenyl)-4-diisopropylbenzene, 1,3-bis [2-(3,5-dimethyl-4-hydroxyphenyl)-2-propyl]benzene, bis (4-hydroxyphenyl) sulfone, bis(3,5-dimethyl-4-hydroxyphenyl) sulfone and 2,2',3,3'-tetrahydro-3,3,3',3'-tetramethyl-1,1'-spirobi[ 1H-indene]-5,5'-diol or mixtures of at least two of these.

Particularly preferred dihydroxyaryl compounds are resorcinol, 4,4'-dihydroxydiphenyl, bis(4-hydroxyphenyl) diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl) cyclohexane, 1,1-bis(3,5-dimethyl-4-hydroxyphenyl) cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene, or mixtures of at least two of these.

Very particularly preferred dihydroxyaryl compounds are 4,4'-dihydroxydiphenyl and 1,1-bis(4-hydroxyphenyl)-3,3,5-trimethylcyclohexane.

It is possible to use either one dihydroxyaryl compound to form homopolycarbonates or different dihydroxyaryl compounds to form copolycarbonates. It is possible to use either one dihydroxyaryl compound of formula (I) or (Ia) (formulae shown below) to form homopolycarbonates or two or more dihydroxyaryl compounds of formula(e) (I) and/or (Ia) to form copolycarbonates. The various dihydroxyaryl compounds may be connected together in random or blockwise fashion. In the case of copolycarbonates composed of dihydroxyaryl compounds of formulae (I) and (Ia), the molar ratio of dihydroxyaryl compounds of formula (Ia) to the other dihydroxyaryl compounds of formula (I) that are optionally usable as well is preferably between 99 mol % of (Ia) to 1 mol % of (I) and 2 mol % of (Ia) to 98 mol % of (I), preferably between 99 mol % of (Ia) to 1 mol % of (I)

and 10 mol % of (Ia) to 90 mol % of (I), and especially between 99 mol % of (Ia) to 1 mol % of (I) and 30 mol % of (Ia) to 70 mol % of (I).

A very particularly preferred copolycarbonate can be prepared using 1,1-bis(4-hydroxyphenyl)-3,3,5-trimethylcyclohexane and dihydroxyaryl compounds of formulae (Ia) and (I).

Suitable carbonic acid derivatives may, for example, be diaryl carbonates of general formula (II)

(II)

in which

R, R' and R" are the same or different and are independently hydrogen, linear or branched $C_1$-$C_{34}$-alkyl, $C_7$-$C_{34}$-alkylaryl or $C_6$-$C_{34}$-aryl, R may additionally also be —COO—R''' where R''' is hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl) phenyl] carbonate and di(methyl salicylate) carbonate.

Very particular preference is given to diphenyl carbonate.

It is possible to use either one diaryl carbonate or different diaryl carbonates.

For control or variation of the end groups, it is additionally possible to use, for example, one or more monohydroxyaryl compound(s) as chain terminators that were not used for preparation of the diaryl carbonate(s) used. These may be those of the general formula (III)

$$\text{(III)}$$

where

R$^A$ is linear or branched C$_1$-C$_{34}$-alkyl, C$_6$-C$_{34}$-alkylaryl, C$_6$-C$_{34}$-aryl or —COO—R$^D$ where R$^D$ is hydrogen, linear or branched C$_1$-C$_{34}$-alkyl, C$_7$-C$_{34}$-alkylaryl or C$_6$-C$_{34}$-aryl, and R$^B$, R$^C$ are the same or different and are independently hydrogen, linear or branched C$_1$-C$_{34}$-alkyl, C$_7$-C$_{34}$-alkylaryl or C$_6$-C$_{34}$-aryl.

Preferred monohydroxyaryl compounds are 1-, 2- or 3-methylphenol, 2,4-dimethylphenol 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenyl-ethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, iso-propyl salicylate, n-butyl salicylate, isobutyl salicylate, tert-butyl salicylate, phenyl salicylate and benzyl salicylate.

Particular preference is given to 4-tert-butylphenol, 4-isooctylphenol and 3-pentadecylphenol.

Suitable branching agents may be compounds having three or more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenyl-methane, 2,2-bis(4,4-bis(4-hydroxyphenyl)cyclohexyl]propane, 2,4-bis(4-hydroxy phenylisopropyl)-phenol and tetra(4-hydroxyphenyl)methane.

Other suitable compounds having three or more functional groups are, for example, 2,4-dihydroxy benzoic acid, trimesic acid/trimesoyl chloride, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

Furthermore, the polymer layer (S1) may include additions such as fillers, dyes, pigments, UV stabilizers and other additives, as also stated below in connection with the polymer layer (S3).

Preferably, the first polymer layer (S1) has transparency in the visible wavelength range, preferably in the range from ≥70% to ≤99%, preferably from ≥80% to ≤95%, particularly preferably ≥90% to ≤93%, determined according to ISO 13468-2:2006-07.

Preferably, the further polymer layer (S2) has transparency in the visible wavelength range, preferably in the range from ≥70% to ≤99%, preferably from ≥80% to ≤95%, particularly preferably ≥88% to ≤93%, determined according to ISO 13468-2:2006-07.

In a preferred embodiment of the multilayer construction (MA), the polymer layer (S2) contains at least one polymer (P2) selected from the group consisting of a polycarbonate, a mixture or a blend of a polycarbonate and a copolyester, or mixtures of at least two of these.

Suitable diphenols may, for example, be dihydroxyaryl compounds of the general formula (I) as already specified above for the diphenols for the polymer (PI). Accordingly, for all statements concerning the diphenols at this juncture reference is made to the statements above concerning the same, these applying equally for the diphenols of polymer (P2).

It is possible to use either one dihydroxyaryl compound to form homopolycarbonates or different dihydroxyaryl compounds to form copolycarbonates. It is possible to use either one dihydroxyaryl compound of formula (I) or (Ia) to form homopolycarbonates or two or more dihydroxyaryl compounds of formula(e) (I) and/or (Ia) to form copolycarbonates. The various dihydroxyaryl compounds may be connected together in random or blockwise fashion. In the case of copolycarbonates composed of dihydroxyaryl compounds of formulae (I) and (Ia), the molar ratio of dihydroxyaryl compounds of formula (Ia) to the other dihydroxyaryl compounds of formula (I) that are optionally usable as well is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and especially between 99 mol % of (Ia) to 1 mol % of (I) and 30 mol % of (Ia) to 70 mol % of (I).

In addition to the examples for suitable dihydroxyaryl compounds listed for (PI), in particular for formation of polymer (P2), are: bis(hydroxyphenyl) ether, bis(hydroxyphenyl) sulfides, 1,1'-bis(hydroxyphenyl)diisopropylbenzenes, 2,2-bis(4-hydroxyphenyl)propane, 2,2-bis(3-methyl-4-hydroxyphenyl)propane, bis(4-hydroxyphenyl) ether, bis (4-hydroxyphenyl) sulfide, particularly preferably 2,2-bis(4-hydroxyphenyl)propane, and also the ring-alkylated and ring-halogenated compounds thereof and mixtures of at least two of these.

For suitable carbonic acid derivatives of the general formula (II) and the chain terminators of the general formula (III), reference is likewise made at this juncture to the statements made in relation to polymer (P1), which applies equally for polymer (P2).

The polymer layer (S2) includes the polymer (P2) preferably within a range from 50% to 100% by weight, more preferably within a range from 70% to 98% by weight, more preferably within a range from 80% to 95% by weight, based on the total weight of the polymer layer (S2).

Furthermore, the polymer layer (S2) may include additions such as fillers, dyes, pigments, UV stabilizers and other additives, as stated below.

In a preferred embodiment of the multilayer construction (MA), the polymer layer (S3) contains at least one polymer (P3) selected from the group consisting of a polycarbonate, a copolycarbonate, and mixtures of at least two of these. The polymer (P3) is preferably selected from the same group of polycarbonates or copolycarbonates as the polymer (P1). Preferably, the polymer (P3) is the same as the polymer (PI).

For the general structure of the polymer (P3), reference is made to the statements, components and other information concerning the polymer (PI), these being equally applicable for the polymer (P3). Even if the components are in principle the same, the polymer (P3) may be of different structure than the polymer (PI) as a result of selecting a few different components.

Preferably, the further polymer layer (S3) includes the polymer (P3) in an amount within a range from ≥80% to 100% by weight, preferably within a range from ≥90% to 99% by weight, particularly preferably from ≥95% to 98% by weight, based on the total weight of the polymer layer (S3). Furthermore, the polymer layer (S3) may include additions such as fillers, dyes, pigments, UV stabilizers and other additives, as stated below.

Preferably, the polymer layer (S3) has the same composition of polymers as the polymer layer (S1). Preferably, the polymer (P3) is identical to the polymer (P1). Preferably, the polymer layer (S3) is identical to the polymer layer (S1).

The polymer layer (S3) is preferably used when the substrate onto which the multilayer construction (MA) is to be laminated contains a polymer that has a similar melting point to the polymer composition of the polymer (P3).

Preferably, the polymer layer (S3) has transparency in the visible wavelength range, preferably in the range from ≥70% to ≤99%, preferably from ≥80% to ≤95%, particularly preferably ≥88% to ≤93%, determined according to ISO 13468-2:2006-07.

In a preferred embodiment of the multilayer construction (MA), the polymer (P1) or the polymer (P3) is a polycarbonate or copolycarbonate of formula (Ia), (I-2), (I-3) or (1-4), with (Ia)

(Ia)

in which $R^1$ and $R^2$ are independently hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, especially benzyl, m is an integer from 4 to 7, preferably 4 or 5, $R^3$ and $R^4$ can be chosen individually for each X and are independently hydrogen or $C_1$-$C_6$-alkyl and X is carbon, with the proviso that, on at least one atom X, $R^3$ and $R^4$ are both alkyl, or (I-2)

-continued (I-3)

(I-4)

in which $R^5$ is a $C_1$- to $C_4$-alkyl radical, aralkyl radical or aryl radical, preferably a methyl radical or phenyl radical, very particularly preferably a methyl radical.

Preferably, the one or more polycarbonates or copolycarbonates based on diphenols of the polymer layer (S1) or (S3) have an Mw (weight-average molecular weight, determined by size exclusion chromatography (SEC) after prior calibration with polycarbonate calibrants) of at least 10 000 g/mol, preferably of 15 000 g/mol to 300 000 g/mol, particularly preferably 17 000 to 36 000 g/mol, very particularly preferably 17 000 to 34 000 g/mol. The polymers (P1) or (P3) may be linear or branched and may be homopolycarbonates or copolycarbonates.

Preferably, the at least one polycarbonate or copolycarbonate based on diphenols at least of the polymer (P1) or polymer (P3) comprises a carbonate structural unit of the formula (I-1).

These polycarbonates or copolycarbonates may be prepared in known fashion from diphenols, carbonic acid derivatives, optionally chain terminators and optionally branching agents. Details of the preparation of polycarbonates have been set out in many patent specifications over the past 40 years or so. Reference may be made here merely by way of example to H. Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverté, BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller, "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299. In the "Encyclopedia of Polymer Science and Technology", John Wiley & Sons, Inc., by Daniel J. Brunelle, the article "Polycarbonates" on pages 1 to 33 describes not only the preparation of suitable polycarbonates or copolycarbonates but particularly in table 3 on pages 10 to 13 describes aromatic polycarbonates based on bisphenols.

Starting materials for the realization of polycarbonate structural units according to formula (I-1) are dihydroxydiphenylcycloalkanes of formula (I-Ia)

(I-1a)

in which

X, $R^1$, $R^2$, $R^3$, $R^4$ and m are as defined for formula (I-1).

Starting materials for the realization of polycarbonate structural units according to formula (I-2), (I-3) and/or (I-4) are dihydroxydiphenylcycloalkanes of formula (I-2a), (I-3a) and/or (I-4a)

(I-2a)

(I-3a)

(I-4a)

in which $R^5$ is a $C_1$- to $C_4$-alkyl radical, aralkyl radical or aryl radical, preferably a methyl radical or phenyl radical, very particularly preferably a methyl radical.

Preferably, in formula (I-Ia), the radicals $R^1$ and $R^2$ are hydrogen.

Preferably, in formula (I-Ia), $R^3$ and $R^4$ are both alkyl on 1-2 atoms X, especially on only one atom X.

The preferred alkyl radical in formula (I-Ia) for $R^3$, $R^4$ is methyl; the X atoms in alpha position to the diphenyl-substituted carbon atom (C-1) are preferably not dialkyl-substituted, and at least one X atom in beta position to C-1 is preferably alkyl-disubstituted.

In a preferred embodiment of the multilayer construction (MA), the polycarbonate or copolycarbonate has been prepared partly from the starting materials selected from the group consisting of:

(Ib)

(Ic)

(Id)

or mixtures of at least two of these.

Preference is given in formula (I-1a) to dihydroxydiphenylcycloalkanes having 5 and 6 ring carbon atoms in the cycloaliphatic radical (m=4 or 5 in formula (I-1a)), for example the diphenols of formulae (I-1b) to (I-1d), with particular preference being given to 1,1-bis(4-hydroxyphenyl)-3,3,5-trimethylcyclohexane (formula (I-1b) with $R^1$ and $R^2$ being H). The polycarbonates can be prepared according to EP 0359953 A1 from diphenols of formula (I-1a).

It is possible to use either one diphenol of formula (I-1a) to form homopolycarbonates or two or more diphenols of formula (I-1a) to form copolycarbonates.

At least one of the polymer layers (S1), (S2) and/or (S3) of the multilayer construction (MA) may also include at least one filler. The filler is preferably at least one color pigment and/or at least one other filler for generating translucency of the filled layers, particularly preferably a white pigment, very particularly preferably titanium dioxide, zirconium dioxide or barium sulfate, and in a preferred embodiment titanium dioxide.

The filling of at least one polymer layer (S1), (S2) or (S3) of the multilayer construction (MA) with at least one such filler can enhance the visibility of incorporated inscription/images, further increasing the perception of enhanced sharpness and resolution.

The fillers mentioned are preferably added in amounts of 2% to 45% by weight, particularly preferably of 5% to 30% by weight, based on the total weight of the respective polymer layer (S1), (S2) or (S3) containing the filler, which may be brought about for example by extrusion or coextrusion. In particular, these are the polymer layers (S2) or, less preferably, (S3). The polymer layer (S1) preferably includes 0% to 1% by weight, more preferably 0.01% to 0.5% by weight, particularly preferably 0.05% to 0.1% by weight of a filler from the list as mentioned above, based on the total weight of the polymer layer (S1).

Preferably, the polymer layers (S1), (S2) and (S3) are free of fillers.

The multilayer construction (MA) comprising at least one polymer layer (S1) and a further polymer layer (S2) and optionally a third polymer layer (S3) can for example, and preferably, be produced by coextrusion of the layers present, lamination of the layer present, or extrusion lamination. i.e. extruding-on the layer(s) containing at least one first polymer layer (S1) and a further polymer layer (S2) and optionally a third polymer layer (S3). Preference is given to the variants of coextrusion and extruding-on. Very particular preference is given to the production of the multilayer construction (MA) by means of coextrusion of at least the polymer layers (S1) and (S2) and optionally (S3).

Preference is accordingly given to a coextruded multilayer construction (MA) comprising at least one further polymer layer (S2) containing at least one blend composed of at least one or more poly- or copolycondensate(s) of an aromatic and/or cycloalkyldicarboxylic acid and aliphatic, cycloaliphatic and/or araliphatic diols having 2 to 16 carbon atoms with one or more poly- or copolycarbonate(s), characterized in that the proportion of poly- or copolycarbonate (s) in this blend is within a range from ≥50% by weight to ≤90% by weight, preferably a range from ≥60% by weight to ≤80% by weight, very particularly preferably within a range from ≥60% by weight to ≤75% by weight, and in that the poly- or copolycondensate(s) of an aromatic and/or cycloalkyldicarboxylic acid and aliphatic, cycloaliphatic and/or araliphatic diols having 2 to 16 carbon atoms include a proportion of cyclohexane-1,4-dimethanol, cyclohexane-1,3-dimethanol and/or 2,2,4,4-tetramethylcyclobutane-1,3-diol within a range from ≥20 to ≤80 mol %, preferably within a range from ≥25 to ≤75 mol % and particularly preferably within a range from ≥25 to ≤70 mol %, based on the diol component. More preferred is a coextruded multilayer construction (MA) comprising at least one further polymer layer (S2) containing at least one or more poly- or copolycondensate(s) of an aromatic and/or cycloalkyldicarboxylic acid and aliphatic, cycloaliphatic and/or araliphatic diols having 2 to 16 carbon atoms with one or more poly- or copolycarbonate(s), characterized in that the proportion of poly- or copolycarbonate(s) in this blend is within a range from ≥50% by weight to ≤90% by weight, preferably a range from ≥60% by weight to ≤80% by weight, very particularly preferably within a range from ≥60% by weight to ≤70% by weight, and in that the poly- or copolycondensate(s) of an aromatic and/or cycloalkyldicarboxylic acid and aliphatic, cycloaliphatic and/or araliphatic diols having 2 to 16 carbon atoms include a proportion of cyclohexane-1,4-dimethanol, cyclohexane-1,3-dimethanol and/or 2,2,4,4-tetramethylcyclobutane-1,3-diol within a range from 30 to 80 mol %, preferably within a range from 30 to 75 mol % and particularly preferably within a range from 32 to 68 mol %, based on the diol component, and a first polymer layer (S1), where this first polymer layer (S1) contains one or more poly- or copolycondensate(s) of an aromatic and/or cycloalkyldicarboxylic acid and aliphatic, cycloaliphatic and/or araliphatic diols having 2 to 16 carbon atoms.

The coextruded multilayer construction (MA) optionally contains a third polymer layer (S3), wherein this third polymer layer comprises one or more poly- or copolycondensate(s) of an aromatic and/or cycloalkyldicarboxylic acid and aliphatic, cycloaliphatic and/or araliphatic diols having 2 to 16 carbon atoms and the layers are arranged in such a way that the two polymer layers (S1) and (S3) form the outer layers of the coextruded multilayer construction (MA).

The multilayer construction (MA) according to the invention, whether extruded or laminated, is exceptionally suitable as a constituent for security documents, preferably identification documents and/or bank cards. The multilayer construction (MA) is especially suitable for inscription by means of laser engraving. When using the multilayer construction (MA), high sharpness and high quality of the elements applied by laser engraving are achieved. By means of laser engraving, it is preferably possible to introduce personalizing lettering and/or images into one of the polymer layers (S1), (S2) or (S3). The multilayer construction (MA) is very particularly preferably suitable for identification documents in the form of bonded or laminated layer composites in the form of plastics cards, such as for example personal identity cards, passports, driver's licenses, credit cards, bank cards, cards for access control or other identity documents etc. Preferred identification documents within the context of the present invention are multilayer sheet-format documents having security features such as chips, photographs, biometric data etc. These security features can be visible or at least interrogable from the outside. Such an identification document preferably has a size between that of a check card and that of a passport. Such an identification document can also be part of a document composed of a plurality of parts, such as for example an identification document made of plastic in a passport that also comprises paper or paperboard parts.

The multilayer construction (MA) exhibits a good adhesion of the individual polymer layers in layer constructions such as for example in security documents, with high resolution, clarity, transparency, planarity and low warpage, even at high lamination temperatures.

Furthermore, the multilayer construction (MA), particularly as a constituent in security documents, preferably identification documents and/or bank cards, has a very good chemical resistance, in particular against acetone and synthetic sebum. The durability of security documents containing the multilayer construction (MA) is better than conventional cards, which is apparent in the synopsis of all the parameters mentioned.

In a preferred embodiment of the multilayer construction (MA), the polycarbonate or copolycarbonate includes the starting compound (Ib) within a range from 10% by weight to 90% by weight, preferably within a range from 15% to 85% by weight, based on the total weight of the polycarbonate or copolycarbonate, or the polycarbonate or copolycarbonate has a molar ratio of (Ib) to other bisphenol A derivatives within a range from 1:10 to 10:1, preferably within a range from 1:5 to 5:1.

In a preferred embodiment of the multilayer construction (MA), the complete multilayer construction (MA) has at least one, preferably at least two, particularly preferably all, of the following properties:

(A) a thickness within a range from 10 to 500 μm, preferably within a range from 20 to 400 μm, particularly preferably within a range from 30 to 200 μm, very particularly preferably within a range from 50 to 100 μm;

(B) a planarity within a range from 5 to 40 mm, preferably within a range from 10 to 30 mm for a 500 mm*600 mm-sized layer construction;

(C) a vertical deviation in the thickness of the multilayer construction (MA) within a range from ≥0.002 to ≤0.020 mm, further preferably within a range from ≥0.003 to ≤0.015 mm, most preferably within a range from ≥0.005 to ≤0.01 mm over the entire area of the multilayer construction (MA);

(D) a layer thickness tolerance of from 4% to 20%, further preferably from 5% to 15%, particularly preferably from 6% to 10%, based on the nominal layer thickness of the multilayer construction (MA);

(E) a heat resistance of up to a temperature of 350° C., more preferably up to 380° C.;

(F) a transparency within a range from 20% to 98%, preferably from 50% to 95%, particularly preferably from 60% to 90%, measured according to ISO 13468-2:2006-07.

The multilayer construction (MA) preferably has at least one, and preferably a combination of properties selected from the group consisting of (A); (B); (C); (D); (E); (F); (A) and (B); (A) and (C); (A) and (D); (A) and (E); (A) and (F); (B) and (C); (B) and (D); (B) and (E); (B) and (F); (C) and (D); (C) and (E); (C) and (F); (D) and (E); (D) and (F); (E) and (F); (A) and (B) and (C); (A) and (B) and (D); (A) and (B) and (E); (A) and (B) and (F); (A) and (C) and (D); (A) and (C) and (E); (A) and (C) and (F); (A) and (D) and (E); (A) and (D) and (F); (A) and (E) and (F); (B) and (C) and (D); (B) and (C) and (E); (B) and (C) and (F); (B) and (D) and (E); (B) and (D) and (F); (B) and (E) and (F); (C) and (D) and (E); (C) and (D) and (F); (C) and (E) and (F); (D) and (E) and (F); (A) and (B) and (C) and (D); (A) and (B) and (C) and (E); (A) and (B) and (C) and (F); (A) and (B) and (D) and (E); (A) and (B) and (D) and (F); (A) and (B) and (E) and (F); (A) and (C) and (D) and (E); (A) and (C) and (D) and (F); (A) and (C) and (E) and (F); (A) and (D) and (E) and (F); (B) and (C) and (D) and (E); (B) and (C) and (D) and (F); (B) and (C) and (E) and (F); (B) and (D) and (E) and (F); (A) and (B) and (C) and (D) and (E); (A) and (B) and (C) and (D) and (F); (A) and (B) and (C) and (E) and (F); (A) and (B) and (D) and (E) and (F); (A) and (C) and (D) and (E) and (F); (B) and (C) and (D) and (E) and (F); (A) and (B) and (C) and (D) and (E) and (F).

The planarity mentioned under property (B) can be established by measuring the height deviation of a 500*600 mm-sized piece of the multilayer construction (MA) with the aid of a ruler when the piece is placed on a flat surface such as a table. Preferably, the planarity is determined on both sides of the planar multilayer construction (MA). Preferably, the values of the planarity measurements on both sides of the multilayer construction (MA) are within the specified range of property (B). Preferably, the planarity values on one side of the (MA) do not deviate by more than 10%, preferably not by more than 5%, from the planarity values on the opposite side of the (MA), with the side of the (MA) with the higher values forming the basis for determining the deviation.

Preferably, one of the polymer layers (S1) or (S3) has at least one, preferably both, of the following properties:

(G) a thickness within a range from 5 to 100 µm, preferably within a range from 6 to 50 µm, particularly preferably within a range from 7 to 40 µm, very particularly preferably within a range from 10 to 30 µm;

(H) a transparency within a range from 20% to 98%, preferably from 50% to 95%, particularly preferably from 60% to 90%, measured according to ISO 13468-2:2006-07.

Preferably, the polymer layer (S2) has at least one, preferably both, of the following properties:

(I) a thickness within a range from 20 to 100 µm, preferably within a range from 25 to 90 µm, particularly preferably within a range from 30 to 80 µm, very particularly preferably within a range from 40 to 70 µm;

(J) a transparency within a range from 20% to 98%, preferably from 50% to 95%, particularly preferably from 60% to 90%, measured according to ISO 13468-2:2006-07.

Preferably, one of the polymer layers (S1), (S2), (S3) or (S4), particularly preferably the polymer layer (S2), includes a laser-sensitive additive, preferably a black pigment, particularly preferably carbon black. The polymer layer containing the laser-sensitive additive can readily be personalized by laser engraving.

The inscription of plastics films by means of laser engraving is referred to in short as laser inscription both in the art and hereinbelow. Accordingly, the term "laser-inscribed" is hereinbelow to be understood as meaning inscribed by laser engraving. The process of laser engraving is known to those skilled in the art and is not to be confused with printing using laser printers.

Suitable laser-sensitive additives include for example so-called laser marking additives, i.e. additives composed of an absorber in the wavelength range of the laser to be used, preferably in the wavelength range of Nd:YAG lasers (neodymium-doped yttrium aluminum garnet lasers). Such laser marking additives and the use thereof in molding compounds are described for example in WO-A 2004/50766 and WO-A 2004/50767 and are commercially available from DSM under the brand name Micabs™. Absorbers likewise suitable as laser-sensitive additives are carbon black and phosphorus-containing tin-copper mixed oxides such as described in WO-A 2006/042714 for example.

The laser-sensitive additive may be present in the polymer layers (S1) and/or (S2) and/or (S3) in an amount of 0.5 to 180 ppm, preferably from 1 to 160 ppm, particularly preferably 5 to 120 ppm. In the context of the invention, ppm is to be understood as meaning ppm by weight unless otherwise stated.

It is preferable for the particle size of the laser-sensitive additive to be within the range from 100 nm to 10 µm and particularly advantageous for it to be within the range from 50 nm to 2 µm.

The optional addition of laser-sensitive additives, preferably black pigments, particularly preferably carbon black, to the polymer layers (S1) and/or (S2) and/or (S3) does not impair the transparency of the multilayer construction (MA).

The invention further provides a method for producing a multilayer construction (MA) having a first outer side (AS1) and a second outer side (AS2) opposite the outer side (ASI), comprising the steps of i) providing at least one first polymer layer (S1);

ii) providing at least one further polymer layer (S2);

iii) optionally providing at least one third polymer layer (S3);

iv) forming a laminate from in each case a separate polymer layer (S1), (S2) and optionally (S3) at a temperature (T1) of ≥150° C., preferably ≥180° C., more preferably ≥200° C., and very particularly preferably ≥210° C.;

wherein at least one of the outer sides (AS1) or (AS2) are formed by one of the polymer layers (S1) or (S3), which in each case include or consist of a polymer (P1) or (P2) and each have a Vicat softening temperature of ≥149° C., preferably ≥160° C., further preferably ≥170° C.; more preferably ≥180° C., determined according to ISO 306:2004 (50 N: 50°/h).

The polymer layers (S1), (S2) and optionally (S3) can be provided in steps i), ii) and optionally iii) in any manner that a person skilled in the art would select for a lamination for producing the multilayer construction (MA). Preferably, they are provided in a continuous lamination system.

Preferably, the sequence of layers (S1) to (S3) prior to step iv) is selected from the group consisting of:

a first polymer layer (S1) as outer side (AS1) followed by a further polymer layer (S2);

a first polymer layer (S1) as outer side (AS1) followed by two identical further polymer layers (S2);

a first polymer layer (S1) as outer side (AS1) followed by two different further polymer layers (S2);

a first polymer layer (S1) as outer side (AS1) followed by at least one further polymer layer (S2) followed by a third polymer layer (S3);

a first polymer layer (S1) as outer side (AS1) followed by at least one further polymer layer (S2) followed by a first polymer layer (S1);

and combinations of at least two of these.

The laminate can be formed in step iv) in any manner that a person skilled in the art would select for a lamination at a temperature (T1) of at least 150° C., and preferably at most 300° C. Preferably, the lamination takes place in the form of a roll lamination in which the polymer layers provided from steps i) to iii) are guided over at least two opposing rollers or rolls, also called a roller pair. Of the at least two rollers or rolls, at least one is heated up to a temperature (T1). Preferably, the roll lamination takes place via two series-connected roller pairs, each of the 4 rollers of which can be heated individually. A cooling station is preferably located in each case between and/or behind the roller pairs and is cooled to a temperature far below (T1). The cooling stations are preferably brought to a temperature within a range of 10 to 100° C., preferably from 15 to 80° C., particularly preferably from 20 to 50° C. The polymer layer (S1), which is located on the outer side (AS1), then comes into contact with the heated rollers or rolls. Depending on which polymer layer forms the second outer layer (AS2), the second roller or roll may also be heated, may be heated to a lesser degree than the first roller or roll, or may not be heated at all. If the second roller or roll also has a temperature (T2) that is above 150° C., the polymer layer that forms the outer side (AS2) is selected from a polymer layer (S1) or (S3).

The contact surface of the rollers on the outer sides (AS1) and (AS2) is preferably 1 to 100 mm, preferably 2 to 50 mm, particularly preferably 3 to 20 mm.

All properties, compositions, dimensions and configurations of the multilayer construction (MA) according to the invention are also applicable in the context of the method for producing the multilayer construction (MA) and are not mentioned again here in order to avoid repetitions.

In a preferred embodiment of the method, the heat input into the respective polymer layer (S1), (S2) or (S3) in step iv) is ≥50 J/s*m$^2$, preferably ≥60 J/s*m$^2$, particularly preferably ≥80 J/s*m$^2$, these figures being given in joules (J)/second (s)*square meter (m$^2$).

In a preferred embodiment of the method, the input of heat to the respective polymer layer (S1), (S2) or (S3) in step iv) for achieving the temperature (T1) starting from 23° C. is effected within ≤15 seconds, preferably ≤10 seconds, more preferably ≤5 seconds, in particular within a range from 5 to 10 seconds.

In a preferred embodiment of the method, the polymer layer (S1) or the polymer layer (S3) includes at least one polymer (P1) or (P3) selected from the group consisting of a polycarbonate, a copolycarbonate, or a mixture of at least two of these.

In a preferred embodiment of the method, the polymer layer (S2) contains at least one polymer (P2) selected from the group consisting of a polycarbonate, a mixture or a blend of a polycarbonate and a copolyester, or a mixture of at least two of these.

The invention further provides a laminate, in particular a security document, containing a multilayer construction (MA) according to the invention or a multilayer construction (MA) obtainable by the method according to the invention.

All properties, compositions, dimensions and configurations of the multilayer construction (MA) according to the invention or the production method thereof are also applicable in the context of the security document and are not mentioned again here in order to avoid repetitions.

Preferably, the security document is an identification document, such as an ID card or a passport, and/or a bank card containing at least one multilayer construction (MA).

The security document, preferably identification document, according to the invention may comprise further additional layers, for example at least one polymer layer (S4), via which for example further information may be introduced into the security document, preferably identification document and/or bank card. Preferably, the polymer layer (S4) includes the polymer (P2) in an amount within a range from 50% to 100% by weight, further preferably within a range from 70% to 98% by weight, particularly preferably within a range from 80% to 95% by weight, based on the total weight of the polymer layer (S4). The polymer layer (S4) may likewise include additives, as already listed for the polymer layers (S1) and (S2), preferably in the same amounts as indicated there.

Preferably, the polymer layer (S4) has transparency in the visible wavelength range, preferably in the range from ≥70% to ≤99%, preferably from ≥80% to ≤95%, particularly preferably ≥88% to ≤93%, determined according to ISO 13468-2:2006-07.

Such further information may for example be personalizing portraits or non-personalizing general information contained for example in the same form in every security document, preferably identification document and/or bank card, of the same type.

Such layers may for example be introduced into the security document, preferably identification document and/or bank card, from films or polymer layers previously provided with this information by means of conventional printing processes, preferably inkjet or laser printing, particularly preferably color printing.

Films or polymer layers that can be printed by means of inkjet printing processes are known per se to those skilled in the art and may for example also be the polymer layers (S4). In particularly preferred embodiments, plastics films or polymer layers (S4) colored white or translucent by means of fillers such as for example titanium dioxide, zirconium dioxide, barium sulfate etc. are used for better visibility of the printed information.

Suitable as polymer layers to be printed by means of laser printing, in particular by means of color laser printing, are in particular those of the polymer layers (S1) or polymer layers (S4) according to the invention and described at the outset that have a specific surface resistance of $10^7$ to $10^{13}$ Ω, preferably of $10^8$ to $10^{12}$ Ω. Specific surface resistance in 2 is determined according to DIN IEC 60093 (1993).

These may preferably be those polymer layers of type (S1) in which, prior to the layer production, to achieve the specific surface resistance, the plastic has had added to it for example an additive selected from tertiary or quaternary, preferably quaternary ammonium or phosphonium salts of a partially fluorinated or perfluorinated organic acid or quaternary ammonium or phosphonium hexafluorophosphates, preferably a partially fluorinated or perfluorinated alkylsulfonic acid, with preference a perfluoroalkylsulfonic acid. These additives may be present in particular in the polymer layer (S1), but also to a minor extent in the polymer layers (S2) and/or (S3).

Preferred suitable quaternary ammonium or phosphonium salts are:

tetrapropylammonium perfluorooctanesulfonate,
tetrapropylammonium perfluorobutanesulfonate,
tetrabutylammonium perfluorooctanesulfonate,
tetrabutylammonium perfluorobutanesulfonate,
tetrapentylammonium perfluorooctanesulfonate,
tetrapentylammonium perfluorobutanesulfonate,
tetrahexylammonium perfluorooctanesulfonate,
tetrahexylammonium perfluorobutanesulfonate,
trimethylneopentylammonium perfluorobutanesulfonate,
trimethylneopentylammonium perfluorooctanesulfonate,
dimethyldineopentylammonium perfluorobutane-
   sulfonate,
dimethyldineopentylammonium perfluorooctane-
   sulfonate,
N-methyltripropylammonium perfluorobutylsulfonate,
N-ethyltripropylammonium perfluorobutylsulfonate,
tetrapropylammonium perfluorobutylsulfonate,
diisopropyldimethylammonium perfluorobutylsulfonate,
diisopropyldimethylammonium perfluorooctylsulfonate,
N-methyltributylammonium perfluorooctylsulfonate,
cyclohexyldiethylmethylammonium perfluorooc-
   tylsulfonate,
cyclohexyltrimethylammonium perfluorooctylsulfonate,
and the corresponding phosphonium salts. The ammonium salts are preferred.

It is also possible with preference to use one or more of the abovementioned quaternary ammonium or phosphonium salts, i.e. mixtures as well.

Of very particular suitability are tetrapropylammonium perfluorooctanesulfonate, tetrabutylammonium perfluorooctanesulfonate, tetrapentylammonium perfluorooctanesulfonate, tetrahexylammonium perfluorooctanesulfonate and dimethyldiisopropylammonium perfluorooctanesulfonate, and the corresponding perfluorobutanesulfonic salts.

Particular preference is given to using dimethyldiisopropylammonium perfluorobutanesulfonate (diisopropyldimethylammonium perfluorobutylsulfonate) as additive.

The salts mentioned are known or can be prepared by known methods. The salts of the sulfonic acids can be prepared for example by combining equimolar amounts of the free sulfonic acid with the hydroxyl form of the corresponding cation in water at room temperature and concentrating the solution. Other preparation processes are described for example in DE-A 1 966 931 and NL-A 7 802 830.

The salts mentioned are with preference added, in amounts of 0.001% to 2% by weight, preferably of 0.1% to 1% by weight, based on the total weight of the respective polymers (P1), (P2) or (P3), to the polymers (P1), (P2) or (P3) prior to shaping to give the multilayer construction (MA) according to the invention, which may preferably be brought about by extrusion or coextrusion.

Preferably, the multilayer construction (MA) according to the invention is used for the accelerated production of a laminate, with production preferably being effected within 15 seconds, further preferably within 10 seconds, particularly preferably within 5 seconds, in particular within a range from 5 to 10 seconds, preferably using temperatures within a range from 180° C. to 230° C., particularly preferably from 190° C. to 210° C. Preferably, simultaneously to the elevated temperature, a pressure is applied within a range from 10 N/cm$^2$ to 400 N/cm$^2$, with preference from 30 N/cm$^2$ to 300 N/cm$^2$, particularly preferably from 40 N/cm$^2$ to 250 N/cm$^2$. Preference is given to the use of the multilayer construction (MA) according to the invention for producing a laminate within 15 seconds, preferably within 10 seconds, particularly preferably within 5 seconds, in particular within a range from 5 to 10 seconds.

The invention further provides for the use of the multilayer construction (MA) according to the invention or the multilayer construction (MA) produced by the method according to the invention for a surface treatment, in particular a lamination, that takes place at least on one side of the multilayer construction (MA) to be laminated at a temperature (T1) within a range from ≥160° C. to ≤250° C., preferably within a range from ≥170° C. to ≤240° C.; more preferably within a range from ≥180° C. to ≤230° C., particularly preferably within a range from ≥185° C. to ≤220° C., very particularly preferably within a range from ≥190° C. to ≤210° C. Preferably, simultaneously to the elevated temperature, a pressure is applied within a range from 10 N/cm$^2$ to 400 N/cm$^2$, with preference from 30 N/cm$^2$ to 300 N/cm$^2$, particularly preferably from 40 N/cm$^2$ to 250 N/cm$^2$.

When using the multilayer construction (MA) according to the invention for a surface treatment, in particular for a lamination, the multilayer construction (MA) is firstly provided and, together with a substrate, for example a polymer layer (S4) that preferably includes a polymer (S2) as has been described above, is exposed to the chosen temperature (T1) and to an elevated pressure for as short a period as possible, preferably for 5 to 30 seconds, preferably 7 to 20 seconds. The pressure is preferably within a range from 10 N/cm$^2$ to 400 N/cm$^2$, with preference from 30 N/cm$^2$ to 300 N/cm$^2$, particularly preferably from 40 N/cm$^2$ to 250 N/cm$^2$. Since both temperature and pressure are preferably transferred to the polymer layers (S1) to (S3) and substrate via a roller or roll, the pressure is also introduced only for the periods mentioned above for the exposure to the selected temperature (T1). The exposure to the elevated temperature (1) and the elevated pressure can also be effected over two or more rolls, for example, 2 to 4 rolls, which together are in contact with the multilayer construction (MA) and further layers, such as (S4), for the stated period of 5 to 30 seconds, preferably 7 to 20 seconds, in order to produce the laminate. After the lamination process, a layer composite is obtained that holds the laminated layers together in such a way that the layer composite can only be separated back into the layers by destroying the laminate or that the individual layers can no longer be detached from one another at all.

All properties, compositions, dimensions and configurations of the multilayer construction (MA) according to the invention and the production process thereof are also applicable within the context of the use thereof.

In a preferred embodiment of the use, the multilayer construction (MA) according to the invention is used for the production of a security document, preferably an identification document, in particular in a construction as described previously for this purpose.

As already mentioned, further security features may have been introduced into the security document. The resulting security document, preferably identification document and/or bank card, may for example be produced in a manner such that a layer stack is assembled from the various polymer layers and substrates for the construction of the security document, preferably identification document and/or bank card, and is laminated to give a layer composite and then cut into the suitable shape for the security document, preferably identification document and/or bank card. Further layers may optionally be applied subsequently to this composite laminate, for example by bonding-on and/or laminating-on further films or by coating using paint compositions.

The examples which follow serve for exemplary elucidation of the invention and should not be seen as limiting. In the context of the description of the polymer layers (S1) to (S3) or of the multilayer construction, reference is also made to films as a synonym for polymer layers.

EXAMPLES

Raw Materials Used:

Eastar™ DN 010 (DN 010): poly- or copolycondensate of a terephthalic acid composed of 54.9% by weight of terephthalic acid, 9.3% by weight (38 mol % based on the diol component) of ethylene glycol and 35.8% by weight (62 mol % based on the diol component) of cyclohexane-1,4-dimethanol, having an inherent viscosity of 0.74 dl/g (measured in a 1:1 mixture of phenol and tetrachloroethane at 25° C.) from Eastman Chemical Company.

Pocan™ B 1600 (PBT 1600): unmodified polycondensate of terephthalic acid and butane-1,4-diol as the diol component having a melt volume rate (MVR) of 14 g/10 min according to ISO 1133 at 260° C. and 2.16 kg from Lanxess AG.

Makrolon™ 3108: high-viscosity amorphous thermoplastic bisphenol A polycarbonate from Covestro AG having an MVR of 6.5 g/10 min according to ISO 1133-1:2011 at 300° C. and 1.2 kg applied weight and a Vicat softening temperature (VST) according to ISO 306:2004 method B120 at 50 N; 120° C./h of 150° C. and a glass transition temperature $T_g$ according to ISO 11357-1,-2 of 149° C.

KRONOS™ 2230: titanium dioxide from Kronos for polycarbonate and other industrial thermoplastics having a TiO$_2$ content of ≥96%.

Example 1: High-Temperature Polycarbonate PC 1 as Polymer (P1) or (P3)

149.0 g (0.65 mol) of bisphenol A (2,2-bis(4-hydroxyphenyl)propane), 107.9 g (0.35 mol) of 1,1-bis(4-hydroxyphenyl)-3,3,5-trimethylcyclohexane, 336.6 g (6 mol) of KOH and 2700 g of water were dissolved with stirring in an inert gas atmosphere. A solution of 1.88 g of phenol in 2500 ml of methylene chloride was then added, 198 g (2 mol) of phosgene were introduced into the well-stirred solution at pH 13 to 14 and 21° C. to 25° C. Thereafter, 1 ml of ethylpiperidine was added and the mixture was stirred further for 45 min. The bisphenoxide-free aqueous phase was removed and the organic phase, after acidification with phosphoric acid, was washed with water until neutral and freed of solvent. The polycarbonate exhibited a relative solution viscosity of 1.255, determined according to DIN EN ISO 1628-1:2009. The Vicat softening temperature of the polymer was determined as 183° C. according to ISO 306:2004 method B120 at 50 N: 120° C./h.

Example 2: High-Temperature Polycarbonate PC 2 as Polymer (P1) or (P3)

Analogously to PC 1, a mixture of 91.6 g (0.40 mol) of bisphenol A and 185.9 g (0.60 mol) of 1,1-bis(4-hydroxyphenyl)-3,3,5-trimethylcyclohexane was reacted to give the corresponding polycarbonate 2. The polycarbonate exhibited a relative solution viscosity of 1.251, determined according to DIN EN ISO 1628-1:2009.

The Vicat softening temperature of the polymer was determined as 204° C. according to ISO 306:2004 method B120 at 50 N: 120° C./h.

Example 3: High-Temperature Polycarbonate PC 3 as Polymer (P1) or (P3)

Analogously to PC 1, a mixture of 44.2 g (0.19 mol) of bisphenol A and 250.4 g (0.81 mol) of 1,1-bis(4-hydroxyphenyl)-3,3,5-trimethylcyclohexane was reacted to give the corresponding polycarbonate.

The polycarbonate exhibited a relative solution viscosity of 1.248, determined according to DIN EN ISO 1628-1:2009.

The Vicat softening temperature of the polymer (PI) was determined as 216° C. according to ISO 306:2004 method B120 at 50 N; 120° C./h.

Example 4: Compounding of a Batch for the Production of a Polymer Layer (S4) Comprising a Thermoplastic as Polymer (P2) and a White Pigment as Filler The batches for the production of a white layer were produced using a conventional twin-screw compounding extruder (ZSK 32) at processing temperatures of 250 to 330° C.

Batches having the compositions according to table I were compounded and then pelletized:

TABLE 1

| Composition of compounds for the production of polymer layers (S4) comprising thermoplastics as polymer (P2) | | |
|---|---|---|
| | Polycarbonate | Kronos ™ 2230 |
| Example 4 | 85% by weight of Makrolon ™ 3108 | 15% by weight |

General Production Procedure for Monolayer Extrusion Films

The system used consists of
an extruder having a screw of 105 mm diameter (D) and a length of 41×D. The screw has a devolatilization zone;
a crosshead;
a slot die having 1500 mm width;
a three-roller smoothing calender with horizontal roller arrangement, wherein the third roller is pivotable by +/−45° relative to the horizontal;
a roll conveyor;
a device for double-sided application of protective film;
a take-off device;
a winding station.

The pellet material of a polymer (P2) was supplied to the extruder hopper. The respective material was melted and conveyed in the respective barrel/screw plasticizing system. The material melt was supplied to the die. The melt passed from the die onto the smoothing calender. On the smoothing calender, the material underwent final shaping and cooling to give a polymer layer (S4) that can serve as a substrate or intermediate layer. Structuring of the film surfaces was achieved using a matt steel roller (no. 4 surface) and a matt rubber roller (no. 4 surface). The film or layer (S4) was subsequently transported through a take-off and then the layer (S4) was wound up. The corresponding white opaque extrusion layers were produced according to table 2 in this way.

TABLE 2

| White opaque monolayer extrusion films | | |
|---|---|---|
| | Compound | Film layer thickness |
| Example 5* | 100% compound 4 | 100 μm |
| Example 6* | 100% compound 4 | 200 μm |

*not according to the invention

TABLE 3

| Transparent monolayer extrusion films | | |
|---|---|---|
| | Compound | Film layer thickness |
| Example 7* | 100% Makrolon 3108 | 50 μm |
| Example 7a* | 100% Makrolon 3108 | 600 μm |

*not according to the invention

Example 8: Compounding of a Masterbatch Containing a Laser-Sensitive Additive The masterbatch that was used for the production of the laserable polymer layer(s) was produced using a conventional twin-screw compounding extruder (ZSK 32) at processing temperatures of 250 to 330° C.

A masterbatch having the following composition was compounded and subsequently pelletized:
99.994% by weight of Makrolon™ 3108 polycarbonate
0.006% by weight (60 ppm) of Vulcan XC 72 101 (carbon black from Cabot) having an average particle size of 95 nm.

General Production Procedure for Extrusion and Coextrusion Films

The system used consists of
an extruder having a screw of 105 mm diameter (D) and a length of 41×D. The screw has a devolatilization zone;
a coextruder for application of the top layer, having a screw of length 25 D and a diameter of 35 mm.
a crosshead;
a specific coextrusion slot die having 1500 mm width;
a three-roller smoothing calender with horizontal roller arrangement, wherein the third roller is pivotable by +/−45° relative to the horizontal;
a roll conveyor;
a device for double-sided application of protective film;
a take-off device;
a winding station.

The pellet material of the base material was supplied to the hopper of the main extruder. The respective material was melted and conveyed in the form of the polymers (P1) or (P2) in the respective barrel/screw plasticizing system. Both material melts were combined in the coextrusion die. The melt passed from the die onto the smoothing calender. On the smoothing calender, the material underwent final shaping and cooling. Structuring of the film surfaces was achieved using a structured metal roller (no. 6 surface) and a structured rubber roller (no. 2 surface). The film was subsequently transported through a take-off and then the film was wound up as a multilayer construction (MA) according to the invention.

The compositions of the films of the examples are described in tables 4 and 5.

TABLE 4

| Composition of the two-layer coextrusion films (examples 9 to 15) | | | | | |
|---|---|---|---|---|---|
| | Layer (S2) | | Layer thickness | Layer (S1) | Layer thickness |
| Example 9 50 μm AB coex film, transparent, non-laserable | M.3108 | 100% | 40 μm | 100% polymer from example 1 | 10 μm |
| Example 10 100 μm AB coex film, transparent, non-laserable | M.3108 | 100% | 80 μm | 100% polymer from example 1 | 20 μm |
| Example 11 50 μm AB coex film, transparent, non-laserable | M.3108 DN 010 PBT 1600 | 65% 25% 10% | 40 μm | 100% polymer from example 1 | 10 μm |
| Example 12 100 μm AB coex film, transparent, non-laserable | M.3108 DN 010 PBT 1600 | 65% 25% 10% | 80 μm | 100% polymer from example 1 | 20 μm |
| Example 13 100 μm AB coex film, laserable | M.3108 MB example 8 | 89% 11% | 80 μm | 100% polymer from example 1 | 20 μm |
| Example 14 50 μm AB coex film, laserable | M.3108 MB example 8 | 89% 11% | 40 μm | 100% polymer from example 2 | 10 μm |

TABLE 4-continued

| | Layer (S2) | | Layer thickness | Layer (S1) | Layer thickness |
|---|---|---|---|---|---|
| Example 15 100 μm AB coex film, laserable | M.3108 MB example 8 | 89% 11% | 80 μm | 100% polymer from example 3 | 20 μm |

_Composition of the two-layer coextrusion films (examples 9 to 15)_

For the production of three-layer multilayer constructions (MA), the procedure was exactly as described for the two-layer constructions, with the difference that the melt of the polymer (P1) was divided into two strands and fed into the die on both sides of the strand of polymer (P2), so as to obtain a multilayer construction (MA) having the layers (S1)-(S2)-(S3).

TABLE 5

_Composition of the three-layer (S1)-(S2)-(S3) coextrusion films (examples 17 to 19)_

| | Layer (S1) | Thickness [μm] | Layer (S2) | Thickness [μm] | Layer (S3) | Thickness [μm] |
|---|---|---|---|---|---|---|
| Example 17 100 μm BAB coex film, laserable | 100% by weight of polymer from example 1 | 10 | M.3108 89% MB example 8 11% | 80 | 100% polymer from example 1 | 10 |
| Example 18 100 μm BAB coex film, laserable | 100% by weight of polymer from example 2 | 10 | M.3108 89% MB example 8 11% | 80 | 100% polymer from example 2 | 10 |
| Example 19 100 μm BAB coex film, laserable | 100% by weight of polymer from example 3 | 10 | M.3108 89% MB example 8 11% | 80 | 100% polymer from example 3 | 10 |

Production of Identification Documents (ID Card) by Roll Lamination (Examples 20 to 31)

The ID documents were laminated according to the layer construction of tables 6 and 7 as follows:

A stack was in each case formed from the films in the stated sequence and the lamination was performed on a Melzer roll laminator using the following parameters.

TABLE 6

_Laminate layer construction_

| Item | Layer type | Selection | Thickness |
|---|---|---|---|
| 1 | One of the polymer layer combinations (S1)-(S2) of examples 9 to 19 | For (MA) according to the invention | 50 or 100 μm, depending on whether (S3) is present |
| 2 | Optionally polymer layer (S3) according to example 7 | Optionally in (MA) according to the invention | 50 μm |
| 3 | For reference: Film from example 7 as a substitute for polymer layer (S1)-(S2) from item 1 | For comparative example as a substitute for item 1 without item 2 | 100 μm |
| 4 | Example 5 substrate polymer (P2) | For (MA) according to the invention and comparative example | 100 μm |
| 5 | Example 6 substrate polymer (P3) | For (MA) according to the invention and comparative example | 200 μm |

The roll laminator has 2 upper and 2 lower standard ID 3-format lamination belts having a width of approx. 120 mm each. Each of the belts has two heating regions and one cooling region (each heating region with 3 heating elements and therebetween a cooling region with 6 cooling elements) and can be heated or cooled separately and comes into contact each with an outer layer of the multilayer construction plus substrate in the form of the polymer layer (S4). Preferably, the two upper lamination belts come into contact with the polymer layer (S1) and the two lower lamination belts with the polymer layer (S4). The lamination belts each have a heating unit M330 and a cooling unit M220. The two upper lamination belts were heated to temperature (T1) as indicated in table 7. The two lower lamination belts were heated to a temperature lower than (T1), as also indicated in table 7. The cooling units are arranged in each case after a heating unit. The residence times are also listed in table 7.

The transit times used in tests 20 to 29 and reference tests 1 and 2 of 2×8 seconds (examples 20 to 29) or 2×14 seconds in reference test 1 or 2 from table 7 were used when calculating the heat flows and heat inputs into the polymer layers (1) or (2). The width and length of the heating zones—i.e. the areas (0.12 m×2 m=0.24 m²)—are the same in the reference tests 1 and 2 as in the tests 20 to 29 according to the invention.

A mean heat flow of 11.47 J/s was used for the reference tests 1 and 2 from table 7. With a contact area of the laminate with the rolls of 0.24 m², this corresponds to a mean heat input onto the upper side of the respective reference laminate of 47.8 J/s*m² (heat flow/area 11.47 J/s: 0.24 m²=47.8 J/s*m²).

For the tests 20 to 29, the mean heat flow was 52.7 J/s and the heat input calculated therefrom was calculated from heat flow/area as 219.6 J/s*m² (52.7 J/s:0.24 m²=219.6 J/s*m²).

The average value was used for the heat input, as the initial flow of heat is very high starting from an initial temperature of 25° C. and continuously decreases as the contact temperatures of 176° C. to 209° C. are approached. Production of Laminates

TABLE 7

Conditions of two reference examples and of examples 20 to 29 according to the invention

| Example | Pressure (bar) Cooling Increase (s) | | Pressure (bar) Heating Increase (s) | | Station temp. (°C) Cooling Elements 7-12 | | Station temp. (°C) Heating Elements 4-6 | Station temp. (°C) Heating Elements 1-3 | Number of cycles | Time (s) | Cards per hour | Note |
|---|---|---|---|---|---|---|---|---|---|---|---|---|
| Reference 1 (not according to the invention) | 1 | 120 | 1 | 80 | 20 | top | 185 | | 2 | 14 per heating cycle | 2616 | Film from ex. 7 developed bubbles |
| | | | | | 20 | bottom | 150 | | | | | |
| Reference 2 (not according to the invention) | 1 | 120 | 1 | 80 | 20 | top | 190 | | 2 | 14 per heating cycle | 2616 | Film from example 7 became bonded to roll |
| | | | | | 20 | bottom | 150 | | | | | |
| 20 (according to the invention) | 1 | 120 | 1 | 80 | 20 | top | 185 | | 2 | 10 per heating cycle | 3442 | Example 9 |
| | | | | | 20 | bottom | 150 | | | | | |
| 21 (according to the invention) | 1 | 120 | 1 | 80 | 20 | top | 185 | | 2 | 10 per heating cycle | 3442 | Example 10 |
| | | | | | 20 | bottom | 150 | | | | | |
| 22 (according to the invention) | 1 | 120 | 1 | 80 | 20 | top | 185 | | 2 | 8 per heating cycle | 4100 | Example 11 |
| | | | | | 20 | bottom | 150 | | | | | |
| 23 (according to the invention) | 1 | 120 | 1 | 80 | 20 | top | 185 | | 2 | 8 per heating cycle | 4100 | Example 12 |
| | | | | | 20 | bottom | 150 | | | | | |
| 24 (according to the invention) | 1 | 120 | 1 | 80 | 20 | top | 200 | | 2 | 8 per heating cycle | 4100 | Example 13 |
| | | | | | 20 | bottom | 150 | | | | | |
| 25 (according to the invention) | 1 | 120 | 1 | 80 | 20 | top | 200 | | 2 | 8 per heating cycle | 4100 | Example 14 |
| | | | | | 20 | bottom | 150 | | | | | |
| 26 (according to the invention) | | 120 | 1 | 80 | 20 | top | 210 | | 2 | 8 per heating cycle | 4100 | Example 15 |
| | | | | | 20 | bottom | 150 | | | | | |
| 27 (according to the invention) | | 120 | 1 | 80 | 20 | top | 210 | | 2 | 8 per heating cycle | 4100 | Example 17 |
| | | | | | 20 | bottom | 150 | | | | | |
| 28 (according to the invention) | | 120 | 1 | 80 | 20 | top | 210 | | 2 | 8 per heating cycle | 4100 | Example 18 |
| | | | | | 20 | bottom | 150 | | | | | |
| 29 (according to the invention) | | 120 | 1 | 80 | 20 | top | 220 | | 2 | 8 per heating cycle | 4100 | Example 19 |
| | | | | | 20 | bottom | 150 | | | | | |

Due to the higher temperature (T1) that can be used on the side of the polymer layer (S1) without the latter melting to such an extent that it displays morphological changes, in contrast to the conventional polymer layers as shown for the reference tests, a markedly increased throughput number could be achieved. The number of pieces could be increased from 2616 per hour with conventional material to 4100 per hour. This could be raised still if the speed of the lamination belts could be increased further. Thus, the maximum number of pieces possible on the system of 4100 pieces/hour was already achieved with a temperature (T1) of 200° C., and the material still showed no structural changes whatsoever, for example in the form of bubbles, even at 220° C. All laminates with the multilayer construction (MA) according to the invention could be laminated much faster than the reference film without loss of adhesive force. The lamination time could be halved, entailing a doubling of the productivity of the roll lamination line.

FIG. 1 schematically illustrates a multilayer construction (MA) 100 according to the invention, comprising a first polymer layer (S1) 10 and a further polymer layer (S2) 20. In addition, the multilayer construction (MA) 100 shown comprises a polymer layer (S3) 30.

FIG. 2 schematically illustrates the method. In step i) 100, the first polymer layer (S1) was provided rolled up on a roll so that it could be guided from the roll to the lamination belt of the laminating machine. In step ii) 200, the further polymer layer (S2) was provided rolled up on a roll so that the further polymer layer (S2) could be guided in parallel with the first polymer layer (S1) to the lamination belt of the laminating machine. Optionally, a third polymer layer (S3) was provided rolled up on a roll so that the third polymer layer (S3) could be guided in parallel with the first polymer layer (S1) and further polymer layer (S2) onto the lamination belt of the laminating machine, such that a layer sequence (S1), (S2), optionally (S3), was formed. In the laminating machine, a laminate composed of the layer sequence (S1), (S2), optionally (S3), was formed at a temperature of 185 to 220° C., as listed in table 7, in step iv) 400. The lamination belt moved at a speed of 0.1 m/s. In an optional step v) 500, the laminate is wound onto a roll.

The invention claimed is:

1. A method for producing a multilayer construction (MA) having a first outer side (AS1) and a second outer side (AS2) opposite the outer side (AS1), comprising the steps of
   i) providing at least one first polymer layer (S1);
   ii) providing at least one further polymer layer (S2);
   iii) optionally providing at least one third polymer layer (S3);
   iv) forming a laminate from in each case a separate polymer layer (S1), (S2) and optionally (S3) at a temperature (T1) of at least 150° C.;
   wherein at least one of the outer sides (AS1) or (AS2) are formed by one of the polymer layers (S1) or (S3), which in each case include a polymer (P1) or (P2) and each have a Vicat softening temperature of ≥149° C., determined according to ISO 306:2004 (50 N; 50°/h), and
   wherein the heat input to the respective polymer layer (S1), (S2) or (S3) in step iv) for achieving the temperature (T1) starting from 23° C. is effected within ≤15 seconds.

2. The method according to claim 1, wherein heat input into the respective polymer layer (S1), (S2) or (S3) in step iv) is ≥50 J/s*m².

3. The method according to claim 1, wherein the polymer layer (S1) or the polymer layer (S3) includes at least one polymer (P1) or (P3) selected from the group consisting of a polycarbonate, a copolycarbonate, or a mixture of a least two thereof.

4. The method according to claim 1, wherein the polymer layer (S2) contains at least one polymer (P2) selected from the group consisting of a polycarbonate, a mixture or a blend of a polycarbonate and a copolyester, or a mixture of at least two thereof.

5. A laminate containing the multilayer construction prepared by the method according to claim 1.

6. A security document comprising the laminate according to claim 5.

7. The method according to claim 1, wherein the heat input to the respective polymer layer (S1), (S2) or (S3) in step iv) for achieving the temperature (T1) starting from 23° C. is effected within ≤10 seconds.

8. The method according to claim 1, wherein the heat input to the respective polymer layer (S1), (S2) or (S3) in step iv) for achieving the temperature (T1) starting from 23° C. is effected within ≤5 seconds.

9. The method according to claim 1, wherein heat input into the respective polymer layer (S1), (S2) or (S3) in step iv) is ≥60 J/s*m².

10. The method according to claim 1, wherein heat input into the respective polymer layer (S1), (S2) or (S3) in step iv) is ≥80 J/s*m².

11. The method according to claim 1, wherein the polymer layer (S3) contains at least one polymer (P3) selected from the group consisting of one polycarbonate, one co-polycarbonate, and mixtures thereof.

12. The method according to claim 1, wherein the polymer (P1) or polymer (P3) is a polycarbonate or copolycarbonate of formula (Ia), (I-2), (I-3) or (I-4), wherein (Ia) is:

$$\text{(Ia)}$$

in which

R$^1$ and R$^2$ are each independently hydrogen, halogen, C$_1$-C$_8$ alkyl, C$_5$-C$_6$ cycloalkyl, C$_6$-C$_{10}$ aryl, or C$_7$-C$_{12}$ aralkyl, m is an integer from 4 to 7, R$^3$ and R$^4$ are chosen individually for each X and are each independently hydrogen or C$_1$-C$_6$ alkyl, and X is carbon with the proviso that on at least one atom X, R$^3$ and R$^4$ are both alkyl, wherein (I-2), (I-3) and (I-4) are:

(I-2)

(I-3)

(I-4)

in which $R^5$ is a $C_1$-$C_4$ alkyl residue, aralkyl residue or aryl residue.

13. The method according to claim 12, wherein the polycarbonate or copolycarbonate is partly produced from starting products selected from the group consisting of:

(Ib)

-continued (Ic)

(Id)

or a mixture of at least two thereof.

14. The method according to claim 13, wherein the polycarbonate or copolycarbonate comprises a starting compound (Ib) in a range of 10% by weight to 90% by weight of the total weight of the polycarbonate or copolycarbonate, or the polycarbonate or copolycarbonate, or the polycarbonate or copolycarbonate has a molar ratio of (Ib) to other bisphenol A derivatives in a range of 1:10 to 10:1.

15. The method according to claim 1, wherein the complete multilayer structure (MA) or one of the polymer layers (S1) or (S3) has at least one of the following properties:

(A) a thickness in a range of 10 to 500 μm;

(B) a vertical deviation of the thickness of the multilayer structure (MA) in a range of ≥0.002 to ≤0.020 mm over the entire surface of the multilayer structure (MA);

(C) a coating thickness tolerance of 4 to 20% based on the average layer thickness of a 500 mm*600 mm layer structure or polymer layer (S1) or (S3);

(D) a heat resistance up to a temperature of 350° C.;

(E) a transparency in a range of 20 to 98% measured according to ISO 13468-2:2006-07.

16. The method according to claim 1, wherein the laminate is formed by a roll lamination in which the polymer layers (S1), (S2) and optionally (S3) are guided over at least two opposing rollers.

17. The method according to claim 16, wherein the wherein at least one roller is heated to temperature (T1).

18. The method according to claim 17, wherein the roll lamination takes place via two series-connected roller pairs.

* * * * *